UNITED STATES PATENT OFFICE.

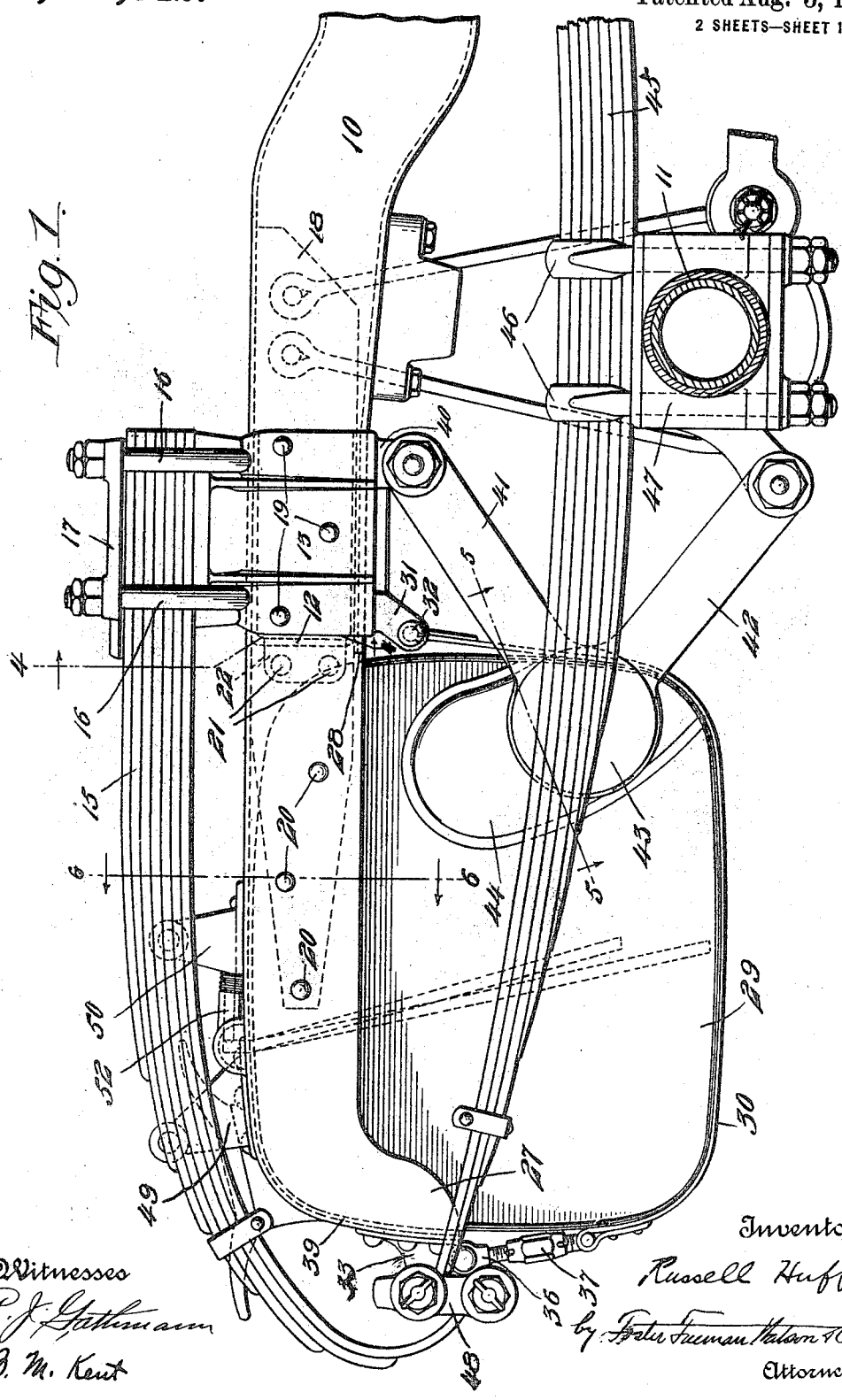

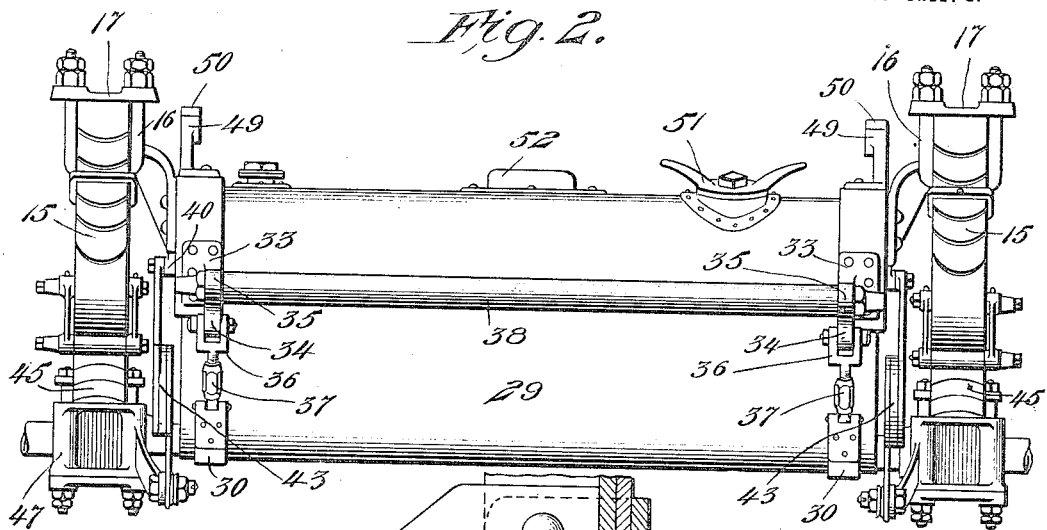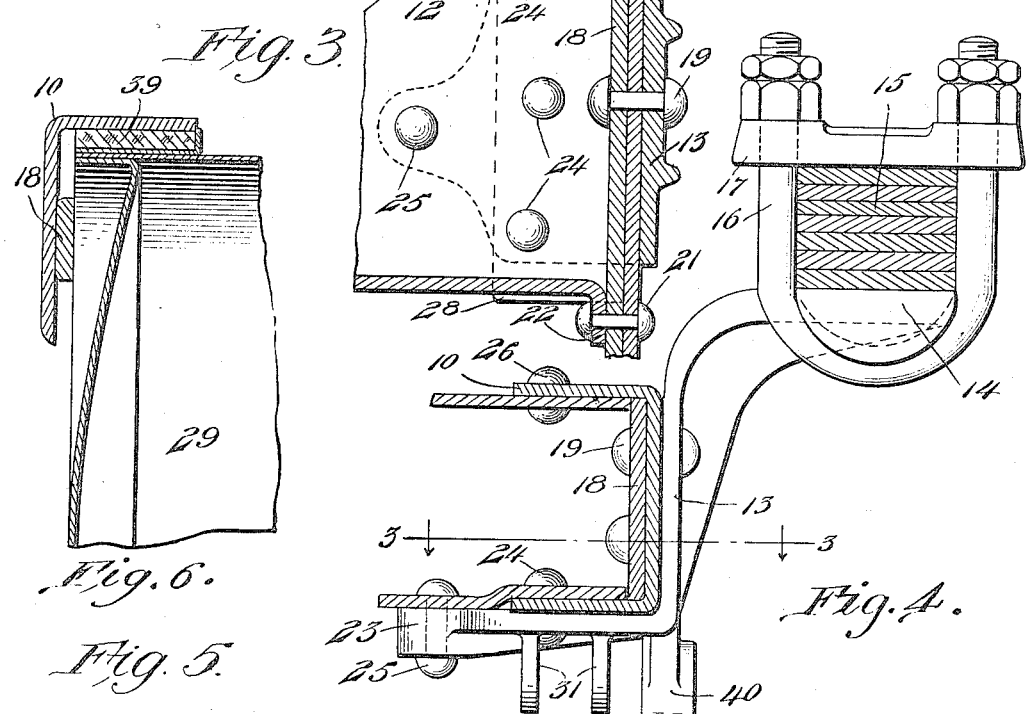

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,148,842.

Specification of Letters Patent.

Patented Aug. 3, 1915.

Application filed December 6, 1912. Serial No. 735,345.

*To all whom it may concern:*

Be it known that I, RUSSELL HUFF, a citizen of the United States, residing at Detroit, county of Wayne, State of Michigan, have invented certain new and useful Improvements in Motor-Vehicles, of which the following is a specification.

This invention relates to improvements in motor vehicles and more particularly to the construction and arrangement of the frame and certain parts associated therewith.

One of the objects of the invention is to provide an improved means for supporting the fuel tank, whereby the latter is readily accessible from the rear of the vehicle and is at the same time thoroughly housed and protected against injury.

Another object of the invention is to provide improved means for supporting a trunk rack at the rear of the vehicle.

Another object is to provide improved means for mounting the frame on the springs at the rear of the vehicle.

Another object of the invention is to provide an improved construction of the fuel tank, in which the ends of the tank are provided with reinforcing pads adapted to prevent the shock absorbers from injuring the tank.

Other objects and the features of novelty will be apparent from the following description taken in connection with the accompanying drawing; in which:

Figure 1 is a side elevation of the rear portion of the frame of a vehicle embodying my invention. Fig. 2 is a rear elevation of the parts shown in Fig. 1. Fig. 3 is a section on the line 3—3 of Fig. 4. Fig. 4 is a section on the line 4—4 of Fig. 1. Fig. 5 is a section on the line 5—5 of Fig. 1. Fig. 6 is a section on the line 6--6 of Fig. 1.

Referring to the drawings, 10 indicates a rear portion of one of the side members of the vehicle frame, 11 the rear axle and 12 the cross member connecting the side members of the frame adjacent the rear axle. The side member 10 of the frame is channel or U-shaped in cross section, as shown in Fig. 4, and has secured thereto the spring bracket 13, which is provided with a seat 14 for the spring 15, the spring being secured to the seat 14 by means of the usual U bolts 16 and a plate 17 arranged above the spring. The side member 10 of the frame has arranged upon its inner side a reinforcing plate 18, and this plate and the bracket 13 are secured to the member 10 by means of rivets 19. The reinforcing plate 18 extends rearwardly of the bracket 13 and has its rear portion secured to the member 10 by means of the rivets 20 and 21, the rivets 21 also securing a rearwardly turned flange 22 on the cross member 12 of the frame. The bracket 13 has a portion 23 thereof arranged below the lower flange of the member 10 and secured thereto in common with the cross member 12 by means of rivets 24. The end of the portion 23 is also secured to the lower flange of the cross member 12 by means of rivets 25 (see Fig. 3). The upper flange of the cross member 12 is secured to the upper flange of the member 10 by means of rivets 26.

It has been customary heretofore to have the side members of the frame terminate at the cross member corresponding to the member 12, but it will be observed that I have extended the side members rearwardly of the cross member 12 and turned the ends 27 of the side members downwardly, as shown in Fig. 1. I also cut away the lower flange from the point 28 so that the side members of the frame rearwardly of the cross member 12 are angle or L-shaped in cross section, as shown in Fig. 6.

By turning the ends of the side members 10 downwardly, as shown in Fig. 1, and cutting the lower flanges of the side members seats are provided for the ends of the fuel tank 29, this tank being preferably of substantially rectangular cross section with well rounded corners along its sides. The tank 29 is secured in position against the under side of the upper flanges of the side members of the frame by means of straps or suspenders 30 which have their forward ends secured to suitable lugs 31 on the lower portion of the brackets 13, by means of pins 32, and their rearward ends secured to suitable brackets 33 on the ends 27 of the side members of the frame. The brackets 33 are preferably riveted to the ends 27 and each is provided with two lugs 34 and 35, the lugs 34 having connected therewith the yokes or clevises 36, which are connected with the ends of the straps 30 by means of the turnbuckles 37, these turnbuckles constituting means for drawing the tank tightly against the under side of the upper flanges of the side members of the frame and also permitting the tank to be readily removed. The lugs 35 on the brackets 33 have secured thereto the cross tie-rod 38 which secures the ends 27 of the side members of the frame together to form a rigid structure.

Referring to Fig. 6 it will be observed that the tank 29 has arranged on its upper side at the ends thereof the pads 39 of a suitable yielding or cushioning material, which prevents rattling and also eliminates wear between the frame and the tank. The brackets 13 are also provided on their under sides with lugs 40, to which are attached one of the arms 41 of the usual shock absorber, the other arm 42 of which is pivoted to a suitable bracket on the axle. The arms 41 and 42 usually extend rearwardly from their pivotal connection with the frame and axle and are joined by a pivotal connection at 43. As will be seen from Figs. 1 and 2 the joints 43 of the shock absorbers are arranged alongside of the ends of the tank 29, and in order to protect the ends of the tank from wear due as a result of the joints 43 coming in contact therewith I have arranged on the ends of the tank the reinforcing and wearing pads 44, shown in Figs. 1 and 4, these pads being secured to the tank in any suitable manner.

As will be observed from Fig. 1 the rear springs consist of a semi-elliptical member 45 secured to the axle 11 by means of suitable U bolts 46 and a seat 47, and the upper quarter elliptical or scroll member 15, these members being connected together at their rear ends by means of the usual shackle device 48. The forward end of the member 45, which is not shown, is connected with the frame in the usual manner. Secured to the upper flange of the side members 10 of the frame are the brackets 49 and 50, to which may be attached a trunk rack. The fuel tank 29 is provided with a suitable filling opening which is closed by means of a cover 51, and a discharge outlet 52, from which the fuel is conducted to the point of use. It will be observed that by having the tank 29 arranged between and supported beneath the rearward extensions of the side members 10 of the frame, the upper portions of the ends of the tank are thoroughly protected against injury and also reinforced, and by having the pads 39 between the tank and the members 10 of the frame it is possible to secure the tank firmly against the under side of the upper flanges of the side members, the pads 39 making it unnecessary to have the tank accurately fit the seats provided therefor.

It will be obvious to those skilled in the art that various changes may be made in the minor details of my invention, within the scope of the appended claims, and therefore I do not wish to be limited to the exact details shown and described.

Having thus described the invention what is claimed as new is:

1. In a motor vehicle, the combination of the side members of the frame, a cross member connecting the side members adjacent the rear of the vehicle, said side members having extensions rearward of said cross member provided with inwardly turned horizontal flanges, below said flanges, said flanges having seats which fit the upper portion of the ends of the tank, and straps secured to said extensions and the end portions of said tank and coöperating with said seats to rigidly secure the tank.

2. In a motor vehicle, the combination of the side members of the frame, a cross member connecting the side members adjacent the rear of the vehicle, said side members having extensions rearward of said cross member which are provided with inwardly turned horizontal flanges, brackets secured to the rearward ends of said extensions, a tank arranged transversely of the vehicle below said flanges, said flanges having seats which fit the upper portions of the ends of the tank, and adjustable straps having one end secured to said brackets and whereby said tank is secured on said seat.

3. In a motor vehicle, in combination, a frame having side members and a cross member, said side members having rearward extensions beyond the cross member which are provided with inwardly turned flanges along their upper edges, a tank mounted at the rear of the frame and between said extension and having the upper edges of its ends below and protected by said flanges, and straps passing under the ends of said tank for securing the tank to said extensions.

4. In a motor vehicle, the combination of a frame comprising side members and a cross member, said side members having integral extensions beyond the cross member, each said extension including a vertical web and a top horizontal flange, a tank having its upper part arranged between the vertical webs of said extensions with the upper edges of its ends beneath portions of said flanges, and means securing the tank to the frame.

5. In a motor vehicle, in combination, a frame, having side members of channel section with the flanges thereof arranged horizontally and turned inwardly and with part of the lower flanges cut away adjacent the rear ends of said members, a tank arranged between the side members where the flanges are cut away and contacting with the under side of the upper flanges of the side members, and means securing the tank to the frame.

6. In a motor vehicle, the combination with the frame and the rear axle, said frame extending rearwardly of said rear axle, of a fuel tank supported on the rearward extension of the frame, a spring bracket secured to the frame forward of said tank, and means connected with said frame and said spring bracket for securing said tank in position.

7. In a motor vehicle, the combination with the side members of the frame and the rear axle, said side members extending rearwardly of said rear axle, of a fuel tank supported on said rearward extensions of said side members, spring brackets secured to said side members, shock absorbers connected with said spring brackets and the rear axle, and means connected with said brackets for securing said tank in position.

8. In a motor vehicle, the combination with the frame and rear axle, the side members of the frame having rearward extensions beyond said axle of angle section with one flange arranged horizontally at the top of said members, and a tank fitted between said side members and supported beneath the horizontal flanges thereof.

9. In a motor vehicle, a frame, the side members of which are of channel section with the flanges thereof arranged horizontally and turned inwardly and with the lower flange cut away at the rearward ends of said side members and the rearward ends bent downwardly, a tank arranged between and contacting with the under side of the upper flange of the side members at the rear ends thereof, and straps passing beneath the end portions of said tank and having their ends secured to said side members and adjustable for the purpose of clamping the tank against the side members.

10. In a motor vehicle, the combination with the frame and rear axle, the side members of the frame extending rearwardly of said rear axle, of a fuel tank supported on the rearward extensions of said side members, a shock absorber connected with the rear axle and one of said side members and having a portion thereof adjacent the end of said tank, and means secured to the end of the tank adapted to prevent the shock absorber from rubbing against the end of said tank.

11. In a motor vehicle, the combination of a frame comprising side members having horizontal flanges, and a cross member arranged adjacent the rear end of said side members, said side members having rearward extensions beyond said cross member, said extensions being bent downwardly at their ends, a tie-rod extending transversely of the frame and connected at its end with the downward extensions, and a tank arranged beneath the horizontal flanges and supported by said extensions.

12. In a motor vehicle, the combination of a frame comprising side members the rearward ends of which are bent downwardly, a tank conforming to and fitting against the under side of said bent portions of the side members, and straps secured at the ends of said bent portions and passing beneath the ends of said tank for supporting the tank.

In testimony whereof I affix my signature in presence of two witnesses.

RUSSELL HUFF.

Witnesses:
H. B. KNAP,
MILO J. BAILEY.

Copies of this trade-mark may be obtained for five cents each, by addressing the "Commissioner of Patents, Washington, D. C."